Dec. 29, 1925.
H. KOHN
NUT LOCK
Filed August 27, 1923
1,567,653
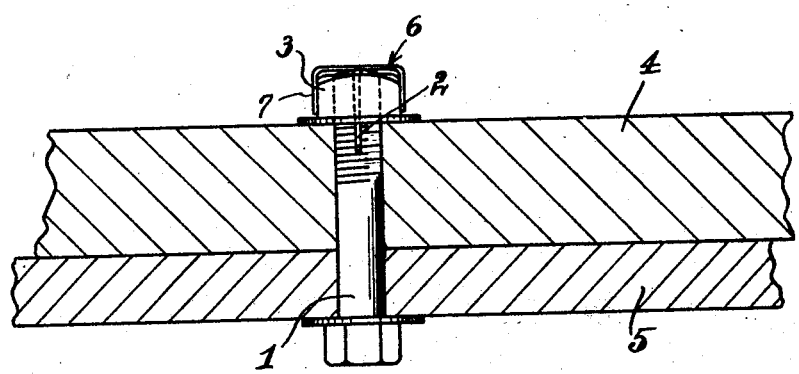
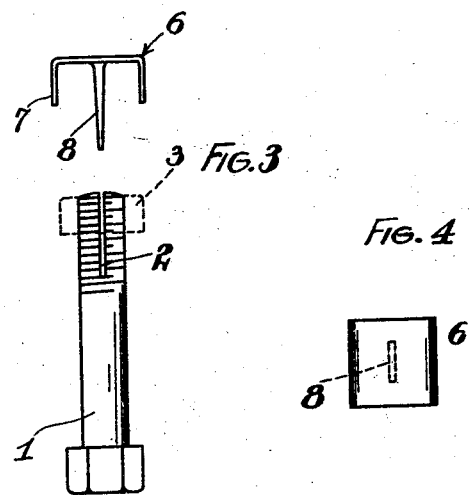
INVENTOR
HERMAN KOHN
ATTORNEY Patented Dec. 29, 1925.

1,567,653

UNITED STATES PATENT OFFICE.

HERMAN KOHN, OF OAKLAND, CALIFORNIA.

NUT LOCK.

Application filed August 27, 1923. Serial No .659,521.

*To all whom it may concern:*

Be it known that I, HERMAN KOHN, a citizen of the United States, residing at Oakland, in the county of Alameda and State of California, have invented certain new and useful Improvements in Nut Locks, of which the following is a specification.

My invention is an improved nut lock.

The object of my invention is to provide a nut lock which is simple in construction and inexpensive to manufacture. My nut lock is designed to operate with an ordinary nut and merely requires that the bolt have a longitudinal slot extending partway therein and preferably from one side of the bolt to the opposite. The lock consists of a channel member, having depending sides and a central tongue to be driven in the slot. The depending sides engage the sides of the nut and keep it from turning.

Other objects of my invention will appear in the course of the specification.

In the annexed drawing in which my invention is illustrated:

Figure 1 is a side view of my nut lock in position on a nut and bolt.

Figure 2 is a side view of my nut lock.

Figure 3 is a side view of a bolt.

Figure 4 is a plan view of my nut lock.

Referring more particularly to the drawing, the bolt 1 has a slot 2 cut in the threaded end thereof. The nut 3 screws onto the bolt to hold the members 4 and 5 together. With my lock it is only necessary that the end of the bolt be approximately flush with the top of the nut, thus saving considerable metal in the length of the bolt and a corresponding length of threads.

My lock consists of a channel member 6, the depending sides 7—7 of which rest on either side of the nut 3, and a tongue 8 which is adapted to enter the slot 2. The tongue 8 is slightly wedge-shaped so that when it is driven into the slot 2 it is held securely in place with the sides 7—7 over the nut to prevent its turning.

Having described my invention, I claim:

1. A nut lock assembly comprising in combination a bolt, a longitudinal slot in the bolt extending completely across from one side to the other, a nut on the bolt, a channel shaped nut lock having a web of such length to cover the bolt and nut, sides depending straight from the web with plane inner surfaces and a tapered central tongue flat on both sides driven in the slot in the bolt the said depending sides engaging the sides of the nut.

2. A nut lock device formed of a channeled shaped metal having a web portion, straight sides depending from the outside edge thereof having plane inner surfaces adapted to engage the sides of a nut and a wedge-shaped centrally depending tongue depending from the mid portion of the web adapted to be driven in the end slot of a bolt.

In testimony whereof I affix my signature.

HERMAN KOHN.